(12) United States Patent
Chien (10) Patent No.: US 9,455,624 B2
(45) Date of Patent: Sep. 27, 2016

(54) POWER SUPPLY WITH POWER FACTOR CORRECTION CIRCUIT

(71) Applicant: MEAN WELL ENTERPRISES CO., LTD, New Taipei (TW)

(72) Inventor: Peng-Hui Chien, New Taipei (TW)

(73) Assignee: MEAN WELL ENTERPRISES CO., LTD. (TW)

( * ) Notice: Subject to any disclaimer, the term of this patent is extended or adjusted under 35 U.S.C. 154(b) by 32 days.

(21) Appl. No.: 14/562,772

(22) Filed: Dec. 8, 2014

(65) Prior Publication Data

US 2015/0311782 A1  Oct. 29, 2015

(30) Foreign Application Priority Data

Apr. 25, 2014  (TW) .............................. 103115054 A (51) Int. Cl.
- *H02M 1/42* (2007.01)
- *H02M 7/06* (2006.01)
- *H02M 1/00* (2006.01)

(52) U.S. Cl.
CPC ... *H02M 1/4216* (2013.01); *H02M 2001/0048* (2013.01); *Y02B 70/126* (2013.01); *Y02B 70/1491* (2013.01)

(58) Field of Classification Search
CPC ................................................. H02M 1/4216
See application file for complete search history.

(56) References Cited

U.S. PATENT DOCUMENTS

| | | | |
|---|---|---|---|
| 6,731,524 B2* | 5/2004 | Elek ....................... | H02M 1/34 323/207 |
| 7,639,520 B1* | 12/2009 | Zansky ............... | H02M 1/4225 363/65 |
| 2006/0175313 A1* | 8/2006 | Kooken .................. | B23K 9/09 219/130.1 |
| 2012/0235649 A1* | 9/2012 | Uno .................... | H02M 1/4225 323/210 |
| 2015/0012151 A1* | 1/2015 | Park ...................... | G05B 15/02 700/298 |

* cited by examiner

*Primary Examiner* — Emily P Pham (57) ABSTRACT

A power supply with power factor correction circuit, comprises three rectifier modules, receiving a first phase voltage, a second phase voltage and a third phase voltage, and further including a filter, a single power factor correction circuit, and a working voltage convertor, wherein the filter receives one voltage and produces a filtering voltage to the single power factor correction circuit, the single power factor correction circuit then produces correction voltage to the working voltage convertor, and the working voltage convertor produces direct voltage; wherein the working voltage convertor can be the full-bridge phase-shifted convertor.

4 Claims, 7 Drawing Sheets

POWER SUPPLY WITH POWER FACTOR CORRECTION CIRCUIT

BACKGROUND OF THE INVENTION

1. Field of the Invention

The present invention relates to a buck—boost power factor correction circuit, and more particularly to a power factor correction circuit able to improve efficiency of increasing and decreasing voltage.

2. Description of Related Art

Power factor in terms of an AC electrical power system relates to real power and apparent power, and is defined as the ratio between real power and apparent power in a circuit. Generally, power factor is used to evaluate amount of useful electric power. Higher power factor means higher efficiency in electrical power system. A power factor correction device in power supply is used to adjust the input timing and waveform of AC current in accordance with the shape of DC voltage waveform, and the power factor is close to 1, then the consuming energy in electrical power system can be controlled according to request standard, so avoiding unnecessary cost to industrial utilities.

Low power factor has low efficiency, costs more energy and draws more current than a load with high power factor for the same amount of useful power transferred. Electric supplier provides not only real power but also extra work for low power factor without correction, and consuming energy in electrical transferring utilities including generator, motor, transfer tool, or even cable increase to compensate low power factor. Power factor calibration is one of the power factor correction devices being widely used in electrical utilities to improve self energy efficiency.

Figure 1:
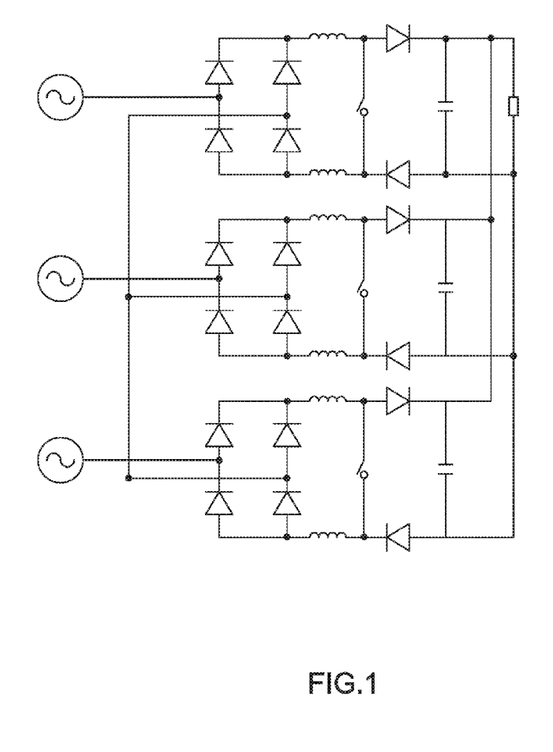
FIG. 1 demonstrates a power factor correction circuit formed by three single-phase power factor correction circuit.

The circuit in power factor calibration can be single-phase power factor correction circuit or three-phase power factor correction circuit. Please refer to FIG. 1, which demonstrating a power factor correction circuit formed by three single-phase power factor correction circuit. As shown in FIG. 1, single-phase power factor correction circuit increases conduction angle of bridge rectifier with LC filter, and reduces electrical harmonic to increase power factor. However, three single-phase power factor correction circuit affect each other during work, and the interference cannot be eliminated by adding shielded inductor, so the efficiency of circuit and the index related to total harmonic distortion of input current are decreased, thus, single-phase power factor correction circuit does not usually be used in electric high power.

Figure 2:
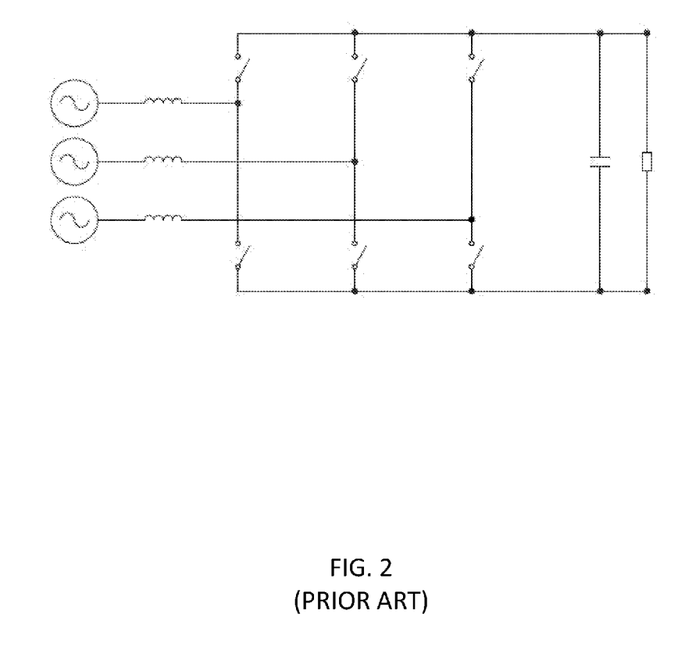
FIG. 2 demonstrates a conventional three-phase power factor correction circuit with six switches.

Please refer to FIG. 2, which demonstrating a conventional three-phase power factor correction circuit with six switches. As shown in FIG. 2, a conventional three-phase power factor correction circuit is formed with six switches, three phase bridges are connected in parallel, each phase bridge has two switches on both sides, and the current in each phase bridge can be controlled by the switches. The sum of the current in three-phase power factor correction circuit is zero, so two phase bridges being controlled is enough for three-phase power factor correction circuit. In practical application, one phase bridge which has the voltage with large absolute value is fixed when other two are controlled simultaneously. The switch times can be regulated and controlled when one phase bridge is fixed, to reduce damage during switching. However, the switches used in three-phase power factor correction circuit require at least six, and complex circuit design with high cost, furthermore, operating switches need to be accurate and precisely, to avoid the risk of short circuit when two switch in one phase bridge turning on in the same time.

Input power to three-phase power factor correction circuit is a fixed value and relatively higher than single-phase power factor correction circuit. The capacitor with smaller capacity can be used in output of three-phase power factor correction circuit, to operate voltage dynamic respond adjustment. Due to switch operation need to be accurate and precisely, the three-phase power factor correction circuit is hard to control. In single-phase power factor correction circuit, power factor is 1 when the load is equal to a resistance. In three-phase power factor correction circuit, power factor is hardly being close to 1 even the load is equal to a resistance, because input current in three phase bridge of three-phase power factor correction circuit is hard to operate, so the sine wave is never performed simultaneously. Conventional skills try to improve and create typical three-phase power factor correction circuits, though, conventional skill requests plenty electrical elements, complex operation, with high voltage operation, so increasing cost.

The single-phase power factor correction circuit and the three-phase power factor correction circuit both have advantage, where single-phase power factor correction circuit has low cost, and three-phase power factor correction circuit can work in high voltage. So the research keeps finding the leverage between both advantages in different electrical circuit appliance.

Thus, for balancing between price and function, reducing element used in structure, keeping response rapidly, the inventor of the present invention based on years of practice experience in the related industry to conduct extensive researches and experiments, and finally developed a power supply with power factor correction circuit in accordance with the present invention to overcome the drawbacks of the prior art.

SUMMARY OF THE INVENTION

Therefore, it is a primary objective of the invention to provide a power supply with power factor correction circuit, the rectifier modules are coupled together without interference, the elements used in circuit are less than conventional three-phase power factor correction circuit, so the power supply provided by present invention balances cost and efficiency with best quality.

To achieve the aforementioned objective, the present invention provides a power supply with power factor correction circuit, connected with a three-phase voltage, and comprising: three rectifier modules, receiving three voltage from the three-phase voltage including a first phase voltage, a second phase voltage and a third phase voltage, and each rectifier module further comprising: a filter, receiving one voltage from the three-phase voltage, and producing a filtering voltage; a single power factor correction circuit, being coupled to the filter, receiving the filtering voltage, producing a correction voltage, and having a main switch; and a working voltage convertor, being coupled with the single power factor correction circuit and a voltage output terminal, receiving the correction voltage, and producing an working voltage to the voltage output terminal; wherein the working voltage convertor of one rectifier module is coupled with the working voltage convertors of other two rectifier modules; at least one power factor correction controller, being connected to the main switches and configured to switch the main switches; and an analog device, being connected to the working voltage convertor and configured to control the working voltage convertor. In the present invention, the current from the voltage output terminal is direct current where indicating the power supply of the present invention is for providing direct current.

DETAILED DESCRIPTION OF THE PREFERRED EMBODIMENTS

The technical contents and characteristics of the present invention will be apparent with the detailed description of a preferred embodiment accompanied with related drawings as follows. It is noteworthy that the drawings are provided for the purpose of illustrating the present invention, but not intended for limiting the scope of the invention.

Figure 3:
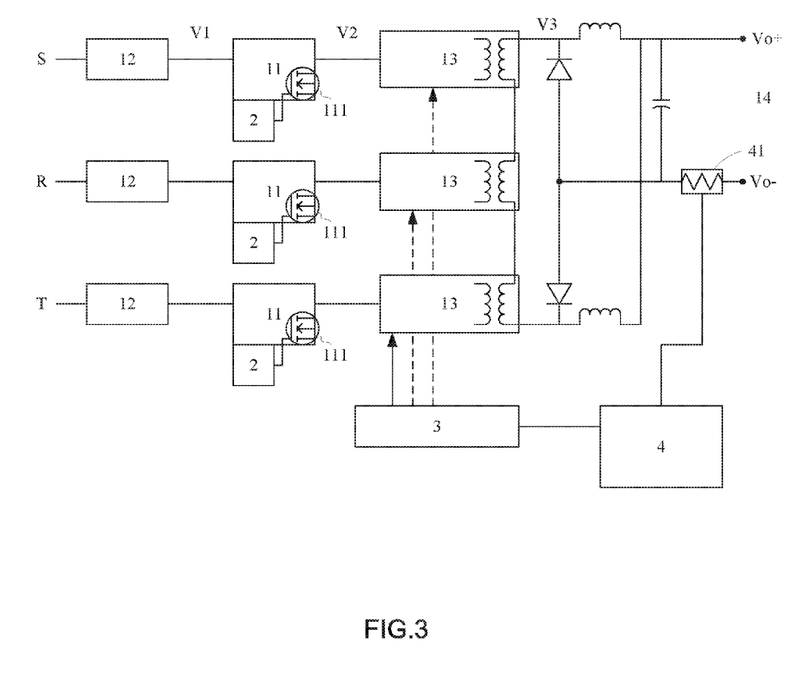
FIG. 3 is a block diagram of a power supply with power factor correction circuit in accordance with the present invention.

With reference to FIG. 3 for block diagram of a power supply with power factor correction circuit in accordance with the present invention. The present invention is a power supply with power factor correction circuit, connected with a three-phase voltage, and comprising: three rectifier modules, receiving three voltage from the three-phase voltage including a first phase voltage S, a second phase voltage R and a third phase voltage T, and each rectifier module further comprising: a filter 12, receiving one voltage from the three-phase voltage, and producing a filtering voltage V1; a single power factor correction circuit 11, being coupled to the filter 12, receiving the filtering voltage V1, producing a correction voltage V2, and having a main switch 111; and a working voltage convertor 13, being coupled with the single power factor correction circuit 11 and a voltage output terminal 14, receiving the correction voltage V2, and producing an working voltage V3 to the voltage output terminal 14; wherein the working voltage V3 is direct voltage; wherein the working voltage convertor 13 of one rectifier module is coupled with the working voltage convertors 13 of other two rectifier modules; at least one power factor correction controller 2, being connected to the main switches 111 and configured to switch the main switches 111; and an analog device 3, being connected to the working voltage convertor 13 and configured to control the working voltage convertor 13. In the present invention, the current from the voltage output terminal 14 is direct current where indicating the power supply of the present invention is for providing direct current. The three-phase voltage in present invention is three-phase electric power, alternating-current electric power generation, providing three complementary currents with a phase separation of one-third cycle by electric power utility.

Figure 4:
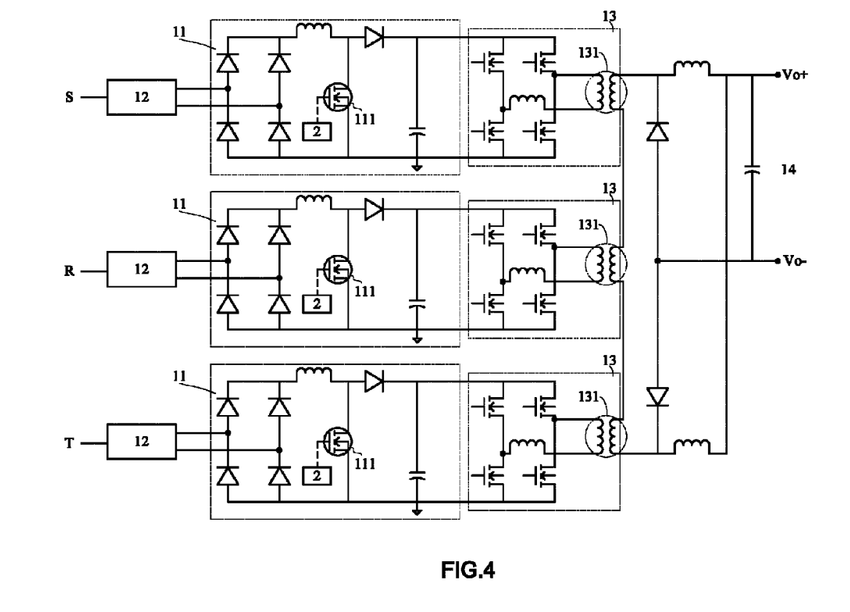
FIG. 4 demonstrates electrical components used in full-bridge phase-shifted convertor and power factor correction circuit in accordance with the present invention.

With reference to FIG. 4 for demonstrating electrical components used in full-bridge phase-shifted convertor and power factor correction circuit in accordance with the present invention, and FIG. 3, the working voltage convertor 13 can be full-bridge phase-shifted convertor with a transformer 131 and four operation transistors, the working voltage convertor 13 of one rectifier module is coupled with the working voltage convertors 13 of other two rectifier modules through secondary of the transformer 131; the analog device 3 is connected to the four operation transistors for controlling the operation transistors; two operation switches are in series, and coupled to other two operation switches in parallel. Wherein the single power factor correction circuit 11 has a bridge rectifier coupled with an inductance, and the main switch 111 and a diode are couple with the inductance; furthermore, the main switch 111 is coupled to the working voltage convertor 13 in parallel, and the diode is coupled to the working voltage convertor 13; a polarized capacitor is coupled to the diode with positive side, and coupled with the working voltage convertor 13 in parallel, also connected to the ground.

In the present invention, the working voltage convertor 13 is operated by analog signal, and the analog device 3 is for provide analog signal to the working voltage convertor 13. In conventional design which adopting single phase convertor, one single-phase convertor is controlled by one analog device 3, so three single-phase convertors are controlled by three analog devices 3. Thus, the present invention provides an electrical circuit with lower cost and same efficiency to the three-phase power factor correction circuit.

As shown in FIG. 3, the present invention further comprises a processor 4, wherein the processor 4 is configured to control the analog device 3; wherein the analog device 3 is for pulse width modulation. a current sensor 41 is coupled with the voltage output terminal 14 and the processor 4, configured to detect current from the voltage output terminal 14 and transfer current data to the processor 4, then the processor 4 determines to control the working voltage convertor 13 through the analog device 3 according to the current data. The processor 4 used in the present invention is microcontroller unit, capable of comparing current data detected by the current sensor 41, determining whether the current data is in default range, outputting signal to control the working voltage convertor 13.

Figure 5:
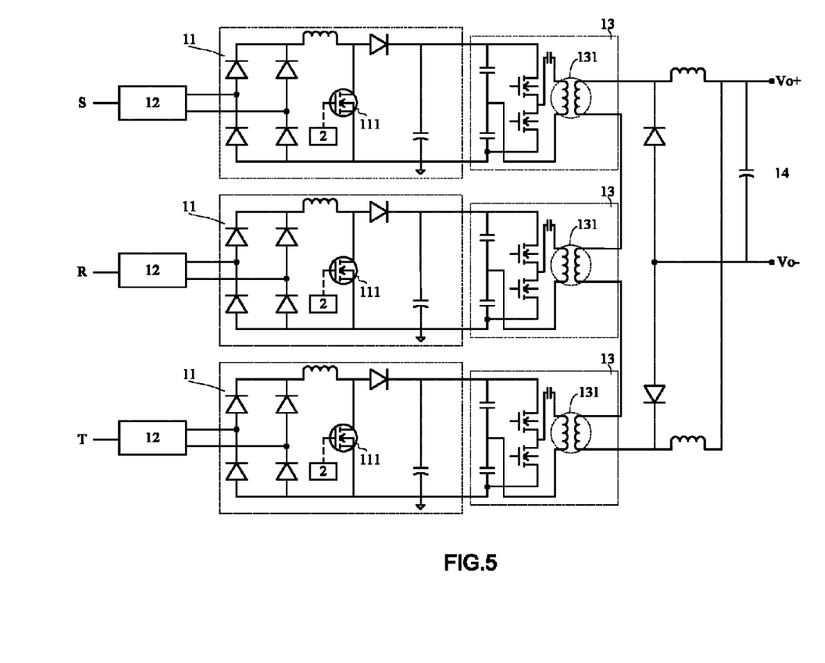
FIG. 5 demonstrates electrical components used in half-bridge phase-shifted convertor and power factor correction circuit in accordance with the present invention.

The working voltage convertor 13 of the present invention can also be a half-bridge phase-shifted convertor, a series-resonant converter and a forward convertor. With reference to FIG. 5 for demonstrating electrical components used in half-bridge phase-shifted convertor and power factor correction circuit in accordance with the present invention, two capacitors are coupled in series, two transistors are coupled in series too, and two capacitors are coupled with the two transistors in parallel, the primary of the transformer 131 is coupled with the two capacitances and the two transistors. Another capacitor is coupled between the two transistors and the transformer 131.

Figure 6:
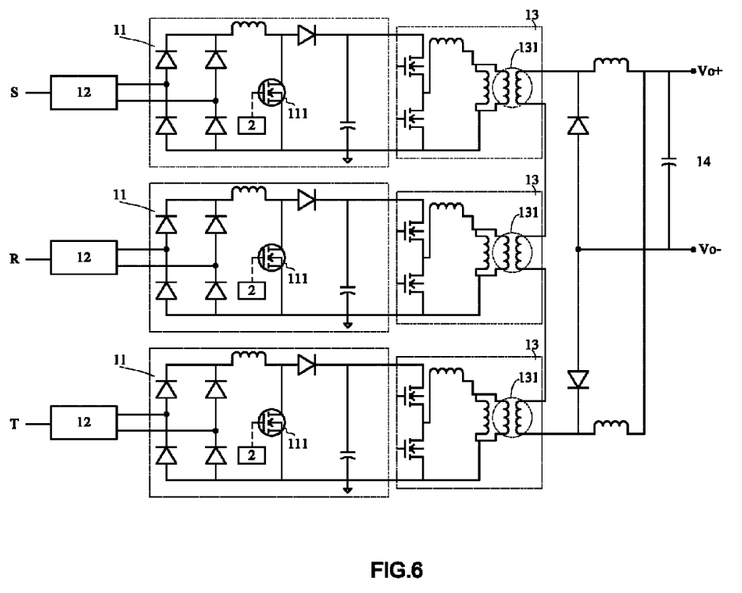
FIG. 6 demonstrates electrical components used in series-resonant converter and power factor correction circuit in accordance with the present invention.
Figure 7:
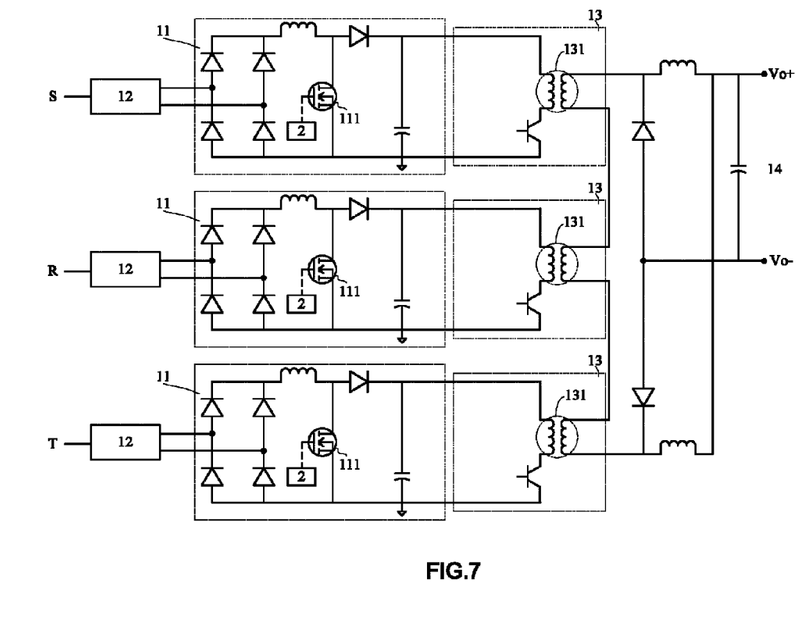
FIG. 7 demonstrates electrical components used in forward convertor and power factor correction circuit in accordance with the present invention.

With reference to FIG. 6 for demonstrating electrical components used in series-resonant converter and power factor correction circuit in accordance with the present invention, two transistors are coupled in series, two inductances are coupled with the two transistors, and one inductance is coupled with the primary of the transformer 131. With reference to FIG. 7 for demonstrating electrical components used in forward convertor and power factor correction circuit in accordance with the present invention, a transistor is coupled to the primary of the transformer 131.

In the present invention, the switch or transistor used in a full-bridge phase-shifted convertor, a half-bridge phase-shifted convertor, a series-resonant converter and a forward convertor are operated by one analog device 3 with high efficiency and low cost. Also, high voltage is available to the present invention with power factor correction circuit design.

In summation, a power supply with power factor correction circuit in accordance with the present invention is disclosed clearly and sufficiently by the foregoing preferred embodiments, and has advantages including:

(1) Conventional single-phase power factor correction circuit has three phase bridge in parallel with certain interfere, and hard to control, furthermore, conventional single-phase power factor correction circuit is easily damage. In present invention, three rectifier modules are separated without interfere, and components can be used in high voltage without damage.

(2) The electrical components used in present invention are less than conventional three-phase power factor correction circuit. The present invention is developed by power factor correction circuit and convertor in less electrical components, to reduce manufacturing process steps and lower cost with high efficiency, also controlled and operated by analog signal.

While the invention has been described by means of specific embodiments, numerous modifications and variations could be made thereto by those skilled in the art without departing from the scope and spirit of the invention set forth in the claims.

What is claimed is:

1. A power supply with power factor correction circuit, connected with a three-phase voltage, and comprising:
   three rectifier modules, receiving three voltage from the three-phase voltage including a first phase voltage, a second phase voltage and a third phase voltage, and each rectifier module further comprising:
      a filter, receiving one voltage from the three-phase voltage, and producing a filtering voltage;
      a single power factor correction circuit, being coupled to the filter, receiving the filtering voltage, producing a correction voltage, and having a main switch; and
      a working voltage convertor, being coupled with the single power factor correction circuit and a voltage output terminal, receiving the correction voltage, and producing working voltage to the voltage output terminal; wherein the working voltage is direct voltage; wherein the working voltage convertor of one rectifier module is coupled with the working voltage convertors of other two rectifier modules;
   at least one power factor correction controller, being connected to the main switch and configured to switch the main switch;
   an analog device, being connected to the working voltage convertor and configured to control the working voltage convertor;
   a processor, wherein the processor is configured to control the analog device; wherein the analog device is for pulse width modulation; and
   a current sensor, wherein the current sensor is coupled with the voltage output terminal and the processor, configured to detect current from the voltage output terminal and transfer current data to the processor, then the processor determines to control the working voltage convertor through the analog device according to the current data.

2. The power supply with power factor correction circuit of claim 1, wherein the working voltage convertor is selected from a group including: a full-bridge phase-shifted convertor, a half-bridge phase-shifted convertor, a series-resonant converter and a forward convertor.

3. The power supply with power factor correction circuit of claim 2, wherein the working voltage convertor is full-bridge phase-shifted convertor with a transformer and four operation transistors; the working voltage convertor of one rectifier module is coupled with the working voltage convertors of other two rectifier modules through secondary of the transformer; the analog device is connected to the four operation transistors for controlling the operation transistors; two operation switches are in series, and coupled to other two operation switches in parallel.

4. The power supply with power factor correction circuit of claim 3, wherein the single power factor correction circuit has a bridge rectifier coupled with an inductance, and the main switch and a diode are couple with the inductance; furthermore, the main switch is coupled to the working voltage convertor in parallel, and the diode is coupled to the working voltage convertor.

* * * * *